(12) United States Patent
Hanrahan

(10) Patent No.: US 8,065,761 B2
(45) Date of Patent: Nov. 29, 2011

(54) INFLATABLE MATTRESS WITH SIDE CUSHIONS FOR A TRUCK BED

(76) Inventor: Terrence Michael Hanrahan, Mission Viejo, CA (US)

( * ) Notice: Subject to any disclaimer, the term of this patent is extended or adjusted under 35 U.S.C. 154(b) by 1072 days.

(21) Appl. No.: 11/527,990

(22) Filed: Sep. 26, 2006

(65) Prior Publication Data

US 2011/0225731 A1    Sep. 22, 2011

(51) Int. Cl.
| A47C 17/64 | (2006.01) |
| B60P 3/38 | (2006.01) |
| A47C 27/08 | (2006.01) |
| A47C 27/10 | (2006.01) |
| A47C 21/04 | (2006.01) |
| A61F 7/00 | (2006.01) |

(52) U.S. Cl. .............. 5/118; 5/706; 5/707; 5/710; 5/421
(58) Field of Classification Search ............ 5/118, 706, 5/420; 296/39.1, 39.2, 190.02, 24.33
See application file for complete search history.

(56) References Cited

U.S. PATENT DOCUMENTS

| 2,648,072 | A | | 8/1953 | De Blieux |
| D179,241 | S | | 11/1956 | Burton et al. |
| 3,648,306 | A | | 3/1972 | Auerbach |
| 3,696,449 | A | | 10/1972 | Smith |
| 3,814,473 | A | | 6/1974 | Lorenzen, Jr. |
| 4,091,149 | A | | 5/1978 | Oxendine |
| 4,136,412 | A | | 1/1979 | Wilhelm |
| 4,396,219 | A | | 8/1983 | Cline |
| 4,866,799 | A | * | 9/1989 | Glackin ............... 5/698 |
| 5,185,896 | A | | 2/1993 | Bonda |
| 5,544,373 | A | | 8/1996 | Chang et al. |
| 5,806,909 | A | * | 9/1998 | Wise ............... 296/39.1 |
| 5,809,597 | A | | 9/1998 | Shaw |
| 5,966,755 | A | * | 10/1999 | Pittman ............... 5/118 |
| 6,185,770 | B1 | | 2/2001 | Wang |
| 6,212,718 | B1 | | 4/2001 | Stolpmann et al. |
| 6,230,340 | B1 | | 5/2001 | Edwards |
| 6,568,006 | B1 | | 5/2003 | Hyland |
| 6,611,981 | B1 | | 9/2003 | Lin |
| 6,631,526 | B1 | | 10/2003 | Enright |
| 6,644,724 | B1 | | 11/2003 | Penaloza et al. |
| 6,763,540 | B1 | * | 7/2004 | Wang ............... 5/710 |
| 2005/0193494 | A1 | * | 9/2005 | Lau ............... 5/706 |
| 2007/0107134 | A1 | * | 5/2007 | Pittman ............... 5/713 |

FOREIGN PATENT DOCUMENTS

| GB | 02105984 | 4/1983 |
| WO | WO 2005032305 | 6/2005 |

* cited by examiner

*Primary Examiner* — Jonathan Liu
(74) *Attorney, Agent, or Firm* — Barcelo, Harrison & Walker LLP; Joshua C. Harrison, Esq.

(57) ABSTRACT

An inflatable mattress for use on a truck bed is disclosed and claimed. The inflatable mattress includes left and right lateral sides. Each lateral side includes a recession dimensioned to receive a respective one of the wheel wells. The inflatable mattress also includes left and right side cushions disposed above and in contact with an upper surface of the mattress adjacent the left and right lateral sides, respectively.

28 Claims, 3 Drawing Sheets

INFLATABLE MATTRESS WITH SIDE CUSHIONS FOR A TRUCK BED

FIELD OF THE INVENTION

The present invention relates generally to cushions designed for use in vehicles, and in particular to mattresses designed for use on truck beds.

BACKGROUND

Trucks having truck beds are sometimes used to transport sensitive items that must be cushioned from severe mechanical shocks. Conventional mattress arrangements that are used on truck beds today are ill-suited for this task at least because items placed on such mattresses may be subjected to sliding or rolling impact with the inner sides of the truck bed during turns and periods of acceleration and deceleration. The shortcomings of conventional mattress designs can be even more conspicuous in military applications where such sensitive items may also need to be protected from intentional harm, where the truck may be operating on unimproved roads or other uneven surfaces, and where the truck operator may experience periods of distraction from the effort to drive the truck smoothly. Thus, there is a need in the art for an improved mattress design for use on truck beds.

SUMMARY

An inflatable mattress for use on a truck bed is disclosed and claimed. The inflatable mattress includes left and right lateral sides. Each lateral side includes a recession dimensioned to receive a respective one of the wheel wells. The inflatable mattress also includes left and right side cushions disposed above and in contact with an upper surface of the mattress adjacent the left and right lateral sides, respectively.

DESCRIPTION OF THE EXEMPLARY EMBODIMENTS

Figure 1:
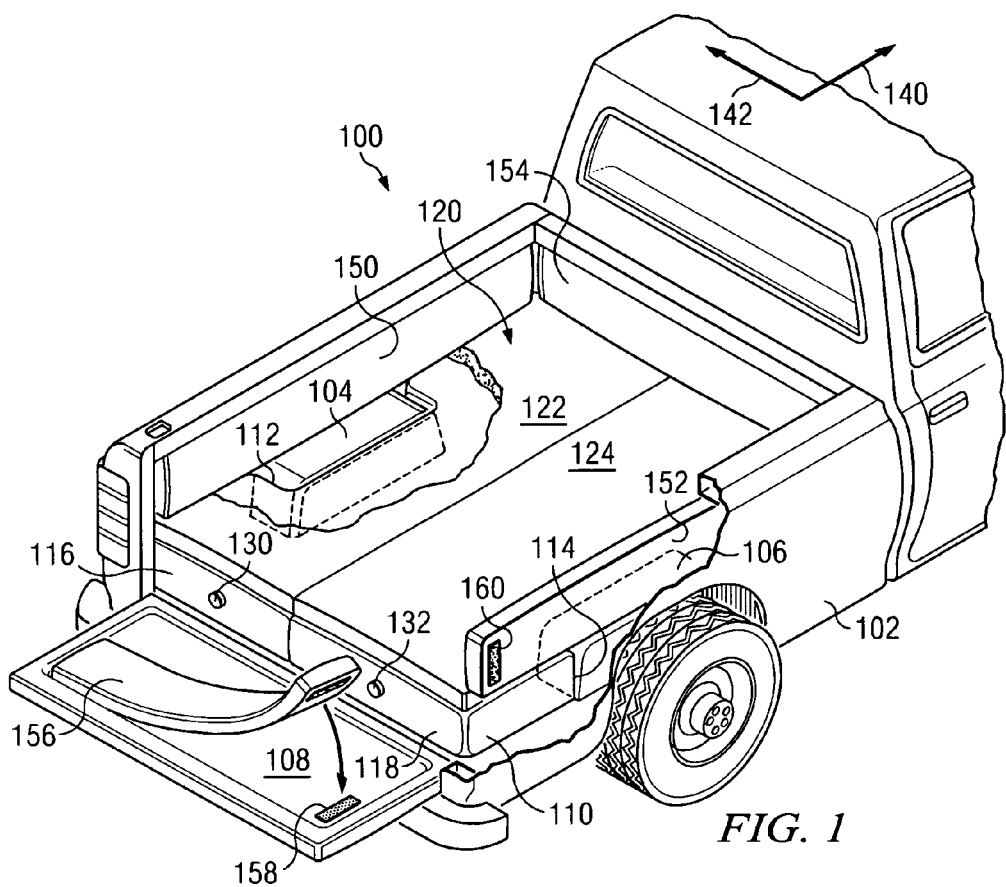
FIG. 1 depicts a mattress according to an embodiment of the present invention that has been positioned on a conventional truck bed.

FIG. 1 depicts a mattress 100 according to an exemplary embodiment of the present invention that has been positioned on a conventional truck bed 102. The truck bed 102 includes a left raised wheel well 104 and a right raised wheel well 106, each wheel well having wheel well sides and a wheel well top. The lateral sides of mattress 100 include a left recession 112 and a right recession 114. The left and right recessions 112, 114 are dimensioned to substantially surround respective wheel well sides.

The mattress 100 further comprises left and right side cushions 150, 152 disposed in contact with an upper surface of mattress 100, adjacent its left and right lateral sides, respectively. The left and right side cushions 150, 152 extend upwards (from where they contact the upper surface of mattress 100) by a side cushion height. In certain embodiments, the side cushion height is chosen so that the thickness of the mattress 100, plus the height of the side cushions, exceeds the vertical extent of the sides of a truck bed into which the mattress may be placed. In other embodiments, the tops of the side cushions may be even with, or under the maximum vertical extent of the truck bed sides. In certain embodiments, the side cushion height is chosen to fall within the range 16 to 48 inches.

In the embodiment shown in FIG. 1, the left and right side cushions 150, 152 are removably attached to the truck bed 102 by a hook & loop interface (e.g. hook & loop interface 160), however the left and right side cushions 150, 152 may instead be removably or permanently attached to the mattress 100, or permanently attached to the truck bed 102. For example, the left and right side cushions 150, 152 may be attached to a lateral surface, or the upper surface of mattress 100.

Figure 4:
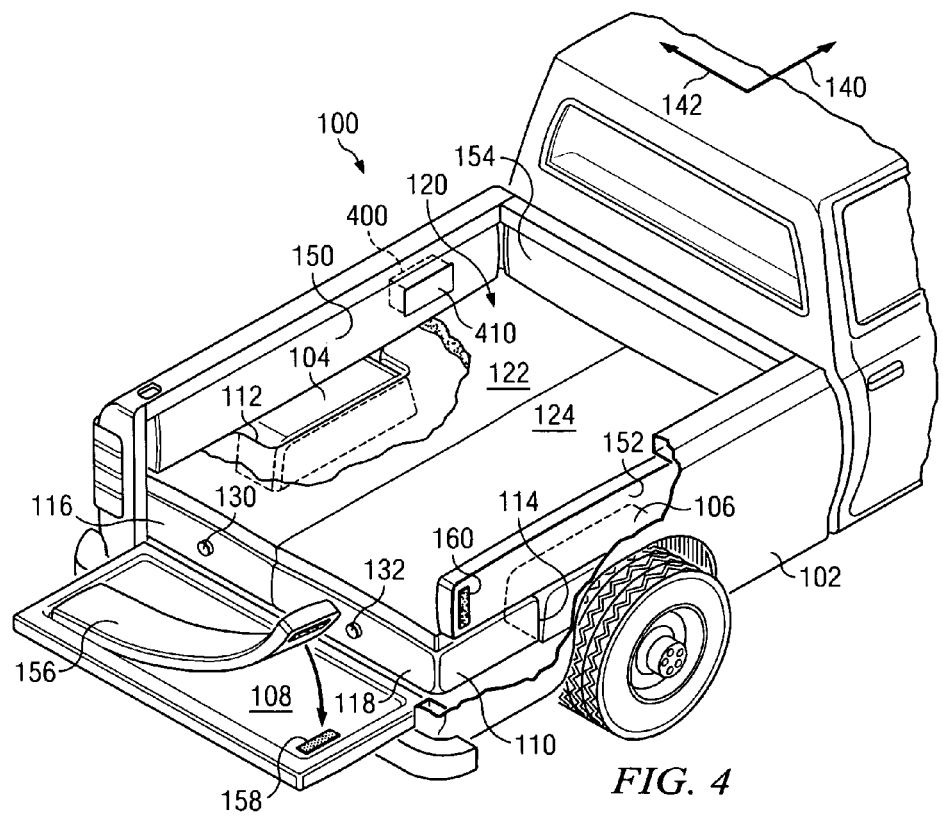
FIG. 4 depicts a mattress according to another embodiment of the present invention that has been positioned on a conventional truck bed.
Figure 4A:
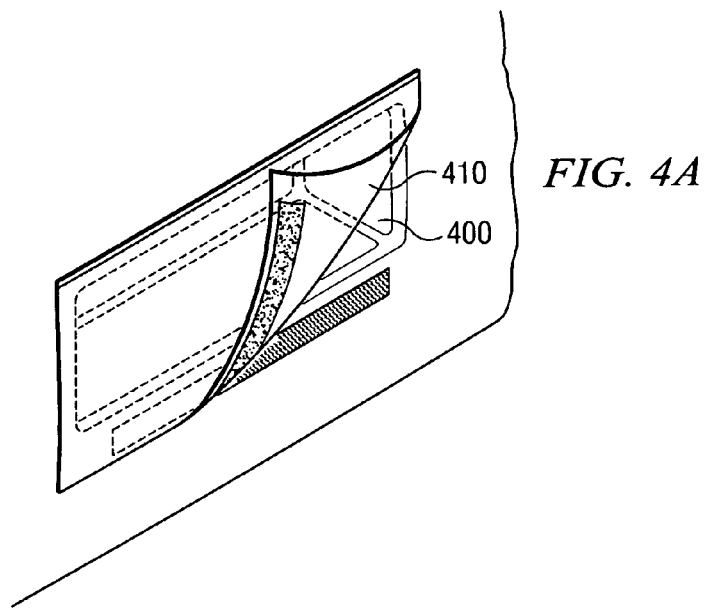
FIG. 4A depicts a portion of the mattress of FIG. 4 that includes a personal belongings alcove.

In certain embodiments, such as the embodiment shown in FIGS. 4 and 4A, the left and/or right side cushions 150, 152 may optionally include a personal belongings alcove 400 (or a cargo pocket) for storage or other purposes. Preferably, the personal belongings alcove is not a through hole, that can be accessed from both sides and through which personal belongings might fall between the truck bed and the side cushion, but is rather a non-through alcove that may only be accessed from one side. Preferably but not necessarily, the personal belongings alcoves (or cargo pockets), if any, are located forward of the left and right recessions 112, 114. The personal belongings alcove 400 may optionally include a covering flap 410 that can be opened for access to stored items, or closed to retain stored items despite motion of the mattress (e.g. due to truck motion). In certain embodiments, the covering flap is completely removable from side cushion 150. In certain other embodiments, such as the embodiment shown in FIG. 4A, at least one side of the covering flap 410 is permanently attached to the side cushion 150 while another side of the covering flap 410 is secured in a closed position by a hook & loop interface with side cushion 150. In certain other embodiments, the personal belongings alcoves, if any, may be disposed in the forward end cushion 154 rather than in side cushions 150, 152.

Figure 5:
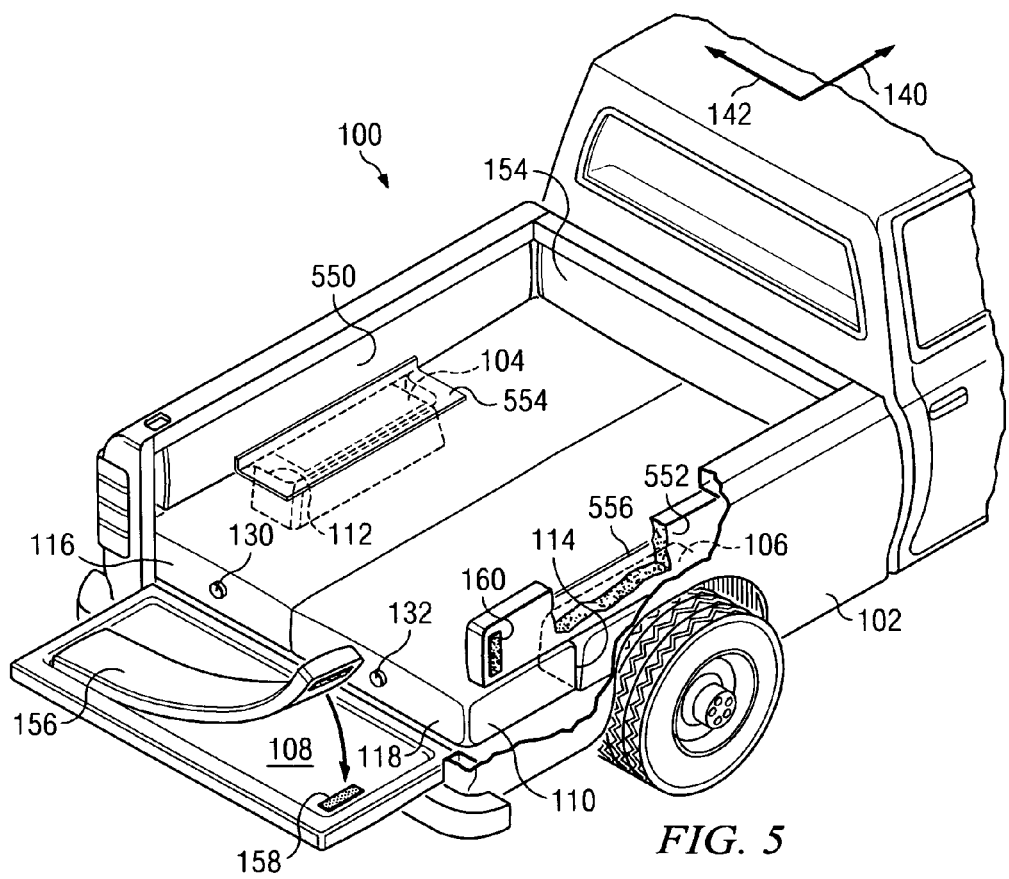
FIG. 5 depicts a mattress according to another embodiment of the present invention that has been positioned on a conventional truck bed.

In certain embodiments, such as the embodiment shown in FIG. 1, the mattress 100 comprises a lower mattress sub-layer 110 and an upper mattress sub-layer 120 dimensioned to substantially cover the lower mattress sub-layer 110 and the wheel well tops. In such embodiments, the upper surface of the mattress 100 is the same as the upper surface of upper mattress sub-layer 120. In other embodiments, such as the embodiment shown in FIG. 5, the upper mattress sub-layer 120 may be absent, so that the mattress 100 is single-layer. In such single-layer embodiments, the wheel well tops may be partially or completely exposed, or else covered by an extension (e.g. extensions 554, 556) of each of the side cushions 550, 552. Extensions 554, 556 may be formed to extend horizontally over the wheel wells 104, 106, or may be hinged to allow horizontal positioning of the extensions 554, 556 over the wheel wells 104, 106 when the side cushions 550, 552 are attached to the mattress 100, and/or may be flexible so that the extensions 554, 556 may be bent to overly the wheel wells 104, 106.

The mattress 100 defines a lengthwise axis 140 (also referred to as a longitudinal axis) and a widthwise axis 142 (also referred to as a lateral axis). In certain embodiments, the lower mattress sub-layer 110 is partitioned lengthwise into at least two sealed longitudinal chambers 116 and 118. Preferably, each of the longitudinal chambers 116 and 118 is separately inflatable via its own fluid-fill opening. For example, in the embodiment shown in FIG. 1, longitudinal chamber 116 includes left recession 112 and is inflatable via fluid-fill opening 130, whereas longitudinal chamber 118 includes right recession 114 and is inflatable via fluid-fill opening 132. As used herein, the term "fluid" includes a gas (e.g. air) and/or a liquid (e.g. water). In certain embodiments, the mattress 100 may further include a conventional electric inflation pump that may be adapted to receive electrical supply (e.g. 12 volts) from the truck on which the mattress 100 is positioned.

Note that in the embodiment of FIG. 1 the fluid-fill openings 130 and 132 are disposed in the aft end of the lower mattress sub-layer 110 (e.g. adjacent tailgate 108), rather than being disposed in the opposing forward end of the lower mattress layer 110. Disposing a fluid-fill opening in the aft end of the mattress may be preferred for convenient access and use of the fluid-fill opening. This preference may also apply to fluid-fill openings that pertain to the upper mattress layer 120, if any.

In certain embodiments, the mattress 100 includes forward and aft end cushions 154, 156 disposed above and in contact with the upper surface of mattress 100, adjacent its forward and aft ends respectively. In the embodiment shown in FIG. 1, aft end cushion 156 only contacts the upper surface of mattress 100 when tailgate 108 is closed. The forward and aft end cushions 154, 156 extend upwards (from where they contact the upper surface of mattress 100) by an end cushion height. In certain embodiments, the end cushion height is chosen so that the thickness of the mattress 100, plus the height of the end cushions, exceeds the vertical extent of a truck bed into which the mattress may be placed. In other embodiments, the tops of the end cushions may be even with, or under the maximum vertical extent of the truck bed. In certain embodiments, the end cushion height is chosen to fall within the range 16 to 48 inches.

In the embodiment shown in FIG. 1, the forward and aft end cushions 154, 156 are depicted as being removably attached to truck bed 102 and tailgate 108, respectively, via hook & loop interfaces (e.g. attachment 158 to tailgate 108). However, the forward and aft end cushions 154, 156 may instead be removably or permanently attached to the mattress 100, or permanently attached to the truck bed 102 and tailgate 108, respectively.

In certain embodiments, each of the left and right side cushions 150, 152 is a sealed chamber that is separately inflatable via its own fluid-fill opening. Alternatively left and right side cushions 150, 152 may include a foam or fiber filler material that is not inflatable, or a foam or fiber filler layer within a chamber that is also inflatable. For example, the left and right side cushions 150, 152 that are shown in FIG. 1 include a foam or fiber filler material that is not inflatable.

In certain embodiments, each of the forward and aft end cushions 154, 156 is a sealed chamber that is separately inflatable via its own fluid-fill opening. Alternatively forward and aft end cushions 154, 156 may include a foam or fiber filler material that is not inflatable, or a foam or fiber filler layer within a chamber that is also inflatable. For example, the forward and aft end cushions 154, 156 that are shown in FIG. 1 include a foam or fiber filler material that is not inflatable.

In certain embodiments, the left and right side cushions 150, 152, and the aft end cushion 156, may include a bullet resistant fabric such as Kevlar. In certain embodiments, the upper surface of mattress 100 may also include such a bullet resistant fabric. In certain applications for the present invention, such as in military transportation applications, the inclusion of such bullet resistant fabric may be advantageous even if the fabric is too thin to stop certain bullets, since by working in conjunction with the material of the truck bed 102 and tailgate 108, the bullet resistant fabric may stop some percentage of bullets, and/or flying shards of metal in the event of a nearby explosion such as that from an improvised explosive device (IED), anti-vehicle mine, or anti-personnel mine. In such military uses, and in civilian hunting uses, soldiers or hunters who choose to rest/sleep on the mattress 100 for a period may also benefit from the increased side protection afforded by the bullet resistant fabric during and immediately after that period.

In certain embodiments, the upper mattress layer 120 is partitioned lengthwise into at least two longitudinal sections 122 and 124. In certain embodiments, each of the longitudinal sections 122 and 124 is a sealed chamber that is separately inflatable via its own fluid-fill opening. Alternatively upper mattress layer 120 may include a foam or fiber filler material that is not inflatable, or a foam or fiber filler layer within a chamber that is also inflatable. For example, the upper mattress layer 120 that is shown in FIG. 1 includes a foam or fiber filler material that is not inflatable. Foam materials may include polyether, polyester, expanded polystyrene, polyurethane foams, polycrylonitriles, reticulated foams, visco-elastic foams, and/or open or closed cell foams. Fiber fillers might encompass natural fibers such as rattan, wool, cotton, down, or may also include man made fibers such as those derived from esters, ethers or urethane bases.

The dimensions of mattress 100 may be chosen to accommodate a range of different conventional truck beds rather than only a single type of conventional truck bed. For example, in the embodiment of FIG. 1 the mattress 100 has a length measured along the longitudinal axis 140 in the range 36 inches to 98 inches, and a maximum width measured along the lateral axis 142 in the range 42 inches to 96 inches. In the embodiment of FIG. 1, the mattress 100 has a minimum width measured along the lateral axis 142 and between the left recession 112 and the right recession 114 in the range 32 inches to 64 inches. In the embodiment of FIG. 1, the lower mattress sub-layer 110 has a thickness in the range 2 inches to 12 inches, and the upper mattress sub-layer 120 has a thickness in the range ½ inch to 8 inches.

Figure 2:
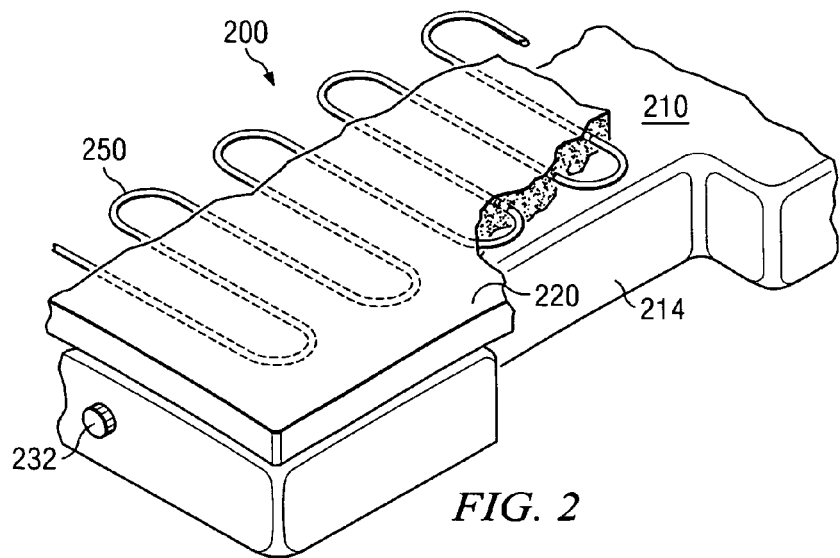
FIG. 2 depicts a portion of a mattress according to another embodiment of the present invention, the embodiment including a heating element.

FIG. 2 depicts a portion of a mattress 200 according to another embodiment of the present invention, the embodiment including a heating element 250. The mattress 200 includes a lower mattress layer 210 that includes a right recession 214. The mattress 200 also includes an upper mattress layer 220 dimensioned to substantially cover the lower mattress layer 210 and the right recession 214. Lower mattress layer 210 is inflatable via fluid-fill opening 232, whereas upper mattress layer 220 may be monolithic or may include a filler material (e.g. foam, fiber). In the embodiment of FIG. 2, the heating element 250 is disposed in the upper mattress layer 220. In certain embodiments, the heating element 250 is adapted to receive an electrical current that is provided from the truck on which the mattress 200 is positioned. For example, the electrical current may originate from a 12 Volt battery in the engine compartment of the truck, and may be passed through a shutoff timer to protect the battery from excessive discharge.

In the embodiment of FIG. 2, heating element 250 is generally electrically conductive but is designed to have a resistance per unit length that is high enough to generate ample heat to warm the mattress user with practical electrical currents. In certain embodiments, a temperature sensor (e.g. thermistor) is used to facilitate control of the voltage applied to the heating element 250. In the embodiment of FIG. 2, the electrical current passed through heating element 250 is limited to prevent excessive vehicle battery discharge and/or the heating element 250 from burning, melting, or changing the properties of the foam or fiber filler material used in upper mattress layer 220.

For example, in the embodiment of FIG. 2, heating element 250 may comprise six lengths of 24 gauge copper wire that are sewn into the upper mattress layer 220 in approximately equally spaced longitudinal orientations, and are electrically connected in series. The total length of the 24 gauge copper wire is then approximately 460 inches, with a wire cross-sectional area of approximately 0.000318 square inches. The copper has a specific electrical resistance of 0.661 μOhm-inches, and so the total resistance of the series combination of wire lengths will be approximately 0.96 Ohms. During operation, approximately 12 Volts is applied to the heating element 356, drawing approximately 12.5 Amps from the vehicle battery and producing 150 Watts of heating in the upper mattress layer 220. In this embodiment, the total vehicle battery discharge over an eight hour period of use is approximately 100 Amp-hours.

In an alternative exemplary embodiment, 28 gauge copper wire is used in heating element 250, instead of 24 gauge wire. This increases the total electrical resistance to approximately 2.4 Ohms, reduces the current draw to approximately 5 Amps, and produces approximately 60 Watts of heating in the upper mattress layer 220. In this alternative embodiment, the total vehicle battery discharge over an eight hour period of use is approximately 40 Amp-hours.

Figure 3:
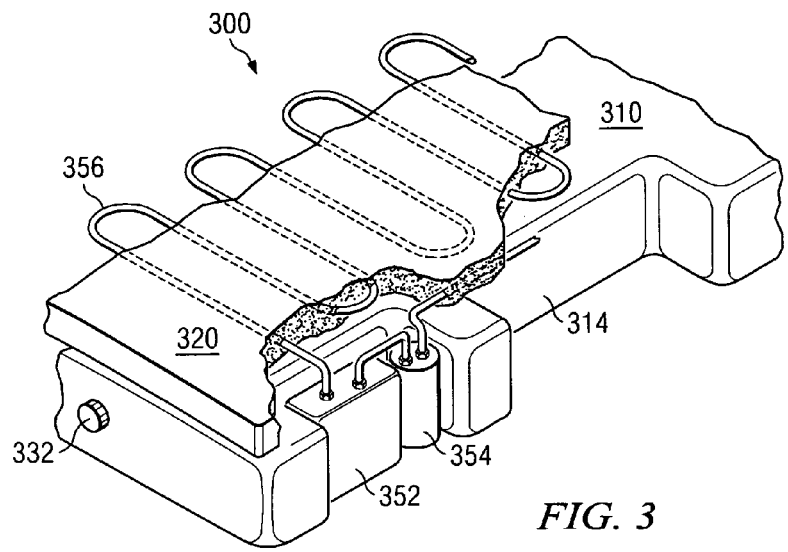
FIG. 3 depicts a portion of a mattress according to another embodiment of the present invention, the embodiment including at least a portion of a cooling system.

FIG. 3 depicts a portion of a mattress 300 according to another embodiment of the present invention, the embodiment including at least a portion of a cooling system. The mattress 300 includes a lower mattress sub-layer 310 that includes a right recession 314. The mattress 300 also includes an upper mattress sub-layer 320 dimensioned to substantially cover the lower mattress sub-layer 310 and the right recession 314. Lower mattress sub-layer 310 is inflatable via fluid-fill opening 332, whereas upper mattress sub-layer 320 includes a foam or fiber filler material. The cooling system, a portion of which is shown in FIG. 3, is an evaporative cooling system and includes a water reservoir 352, water pump 354, and a at least one water distribution tube 356. However a closed cycle cooling system, and/or a cooling system in which the working fluid is not water, may also be used with mattress 300. In the embodiment of FIG. 3, the water distribution tube 356 is serpentine in shape and is disposed in the upper mattress sub-layer 320.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

I claim:

1. An inflatable mattress for use on a truck bed, the truck bed having left and right raised wheel wells, the inflatable mattress comprising:
   an inflatable lower mattress sub-layer having left and right lateral sides, each lateral side including a recession dimensioned to receive a respective one of the wheel wells;
   an upper mattress sub-layer, the upper mattress sub-layer having an upper surface and being dimensioned to substantially cover the lower mattress sub-layer and both the left and right raised wheel wells; and
   left and right side cushions disposed above and in contact with the upper surface adjacent the left and right lateral sides, respectively.

2. The inflatable mattress of claim 1 wherein the inflatable lower mattress sub-layer is partitioned lengthwise into at least two sealed longitudinal chambers, each chamber separately inflatable via its own fluid-fill opening.

3. The inflatable mattress of claim 1 wherein the upper mattress sub-layer includes an aft end and an opposing forward end, and further comprising forward and aft end cushions with the forward end cushion disposed above and in contact with the upper surface adjacent the forward end.

4. The inflatable mattress of claim 3 wherein the left and right side cushions and the forward and aft end cushions are inflatable.

5. The inflatable mattress of claim 3 wherein the left and right side cushions and the forward and aft end cushions comprise a filler material selected from the group consisting of a foam material or a fiber material.

6. The inflatable mattress of claim 3 wherein the forward end cushion is attached to the upper surface adjacent the forward end.

7. The inflatable mattress of claim 6 wherein the attachment is made by at least one hook and loop interface.

8. The inflatable mattress of claim 3 wherein the forward end cushion is attachable to the truck bed.

9. The inflatable mattress of claim 3 wherein the aft end cushion is attachable to a tailgate of the truck bed.

10. The inflatable mattress of claim 3 wherein the left and right side cushions and the aft end cushion each include a bullet resistant fabric.

11. The inflatable mattress of claim 10 wherein the bullet resistant fabric comprises Kevlar.

12. The inflatable mattress of claim 1 wherein the upper mattress sub-layer comprises a filler material selected from the group consisting of a foam material or a fiber material.

13. The inflatable mattress of claim 1 wherein the upper mattress sub-layer is inflatable.

14. The inflatable mattress of claim 1 wherein the inflatable lower mattress sub-layer has a length in the range 36 inches to 98 inches.

15. The inflatable mattress of claim 1 wherein the inflatable lower mattress sub-layer has a maximum width in the range 42 inches to 84 inches.

16. The inflatable mattress of claim 1 wherein the inflatable lower mattress sub-layer has a minimum width measured between the left and right recessions in the range 32 inches to 64 inches.

17. The inflatable mattress of claim 1 wherein the inflatable lower mattress sub-layer has a thickness in the range 2 inches to 20 inches.

18. The inflatable mattress of claim 1 further comprising an electric inflation pump.

19. The inflatable mattress of claim 1 further comprising at least one heating element.

20. The inflatable mattress of claim 1 further comprising at least a portion of a cooling system.

21. The inflatable mattress of claim 20 wherein the cooling system is an evaporative cooling system and the portion includes at least one water distribution tube.

22. The inflatable mattress of claim 1 wherein the left and right side cushions each define a side cushion height in the range 16 to 48 inches.

23. The inflatable mattress of claim 1 wherein at least one of the left and right side cushions includes a non-through storage alcove.

24. The inflatable mattress of claim 23 wherein the non-through storage alcove is disposed forward of at least one of the lateral side recessions.

25. The inflatable mattress of claim 23 wherein the non-through storage alcove includes a covering flap.

26. The inflatable mattress of claim 1 wherein the left and right side cushions are attached to the upper surface adjacent the left and right lateral sides, respectively.

27. The inflatable mattress of claim 26 wherein the attachment is made by at least one hook and loop interface.

28. The inflatable mattress of claim 1 wherein the left and right side cushions are attachable to the truck bed.

* * * * *